Figure 1:
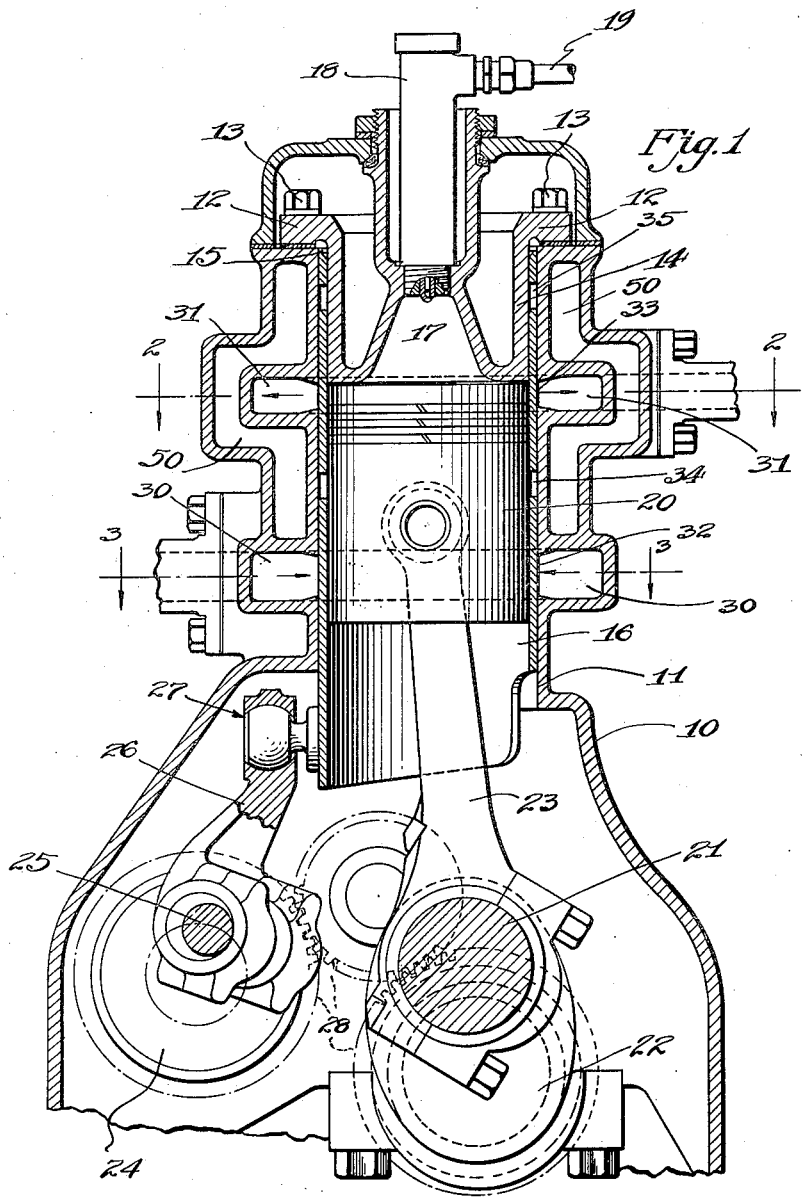

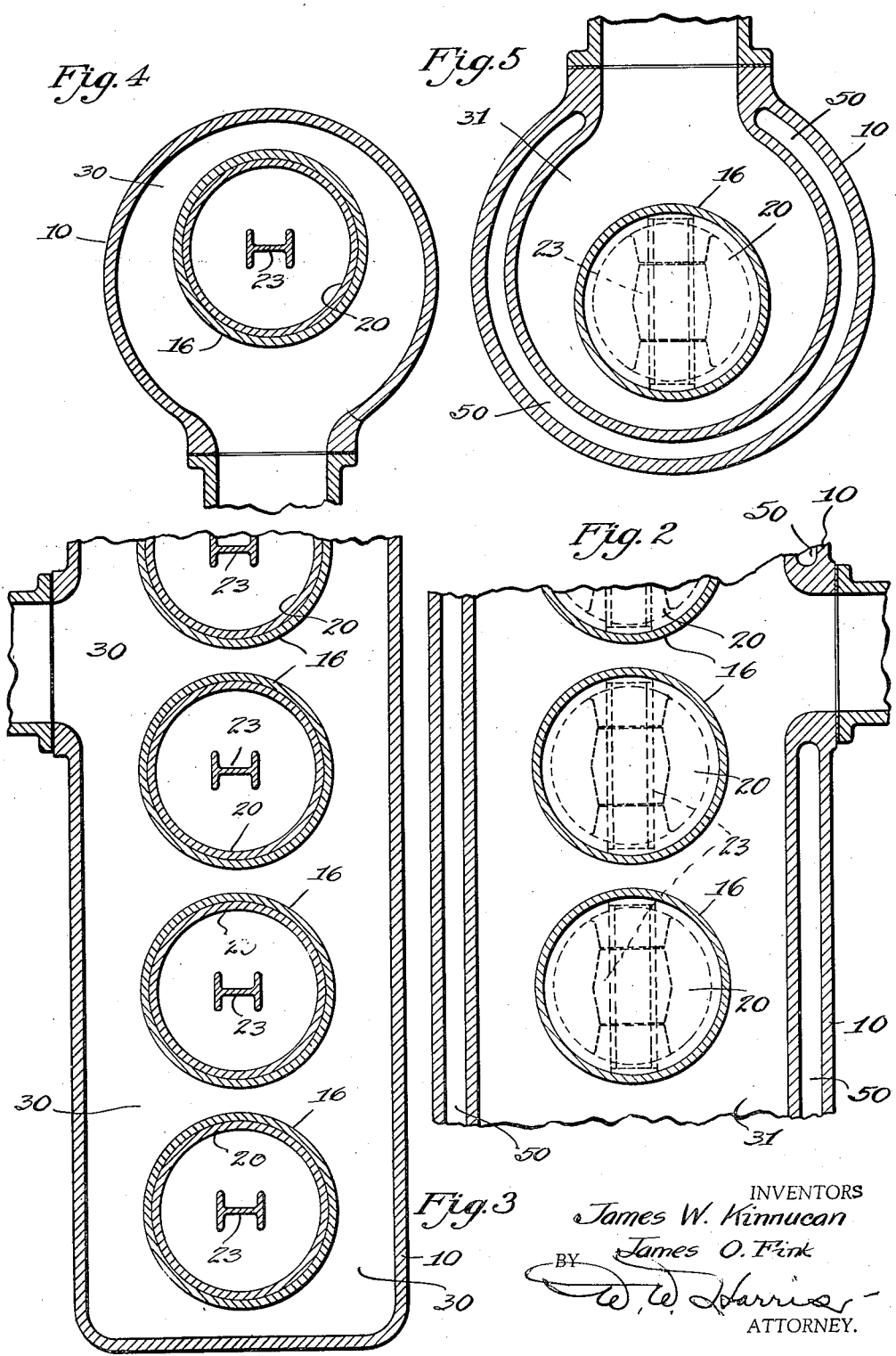

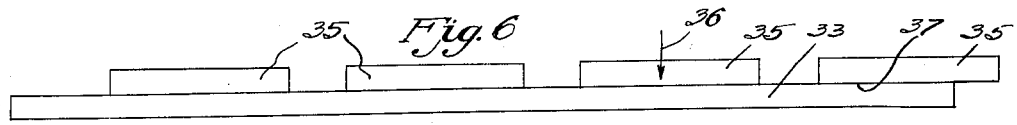
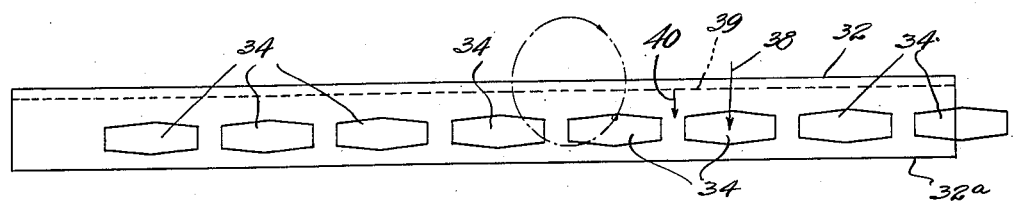
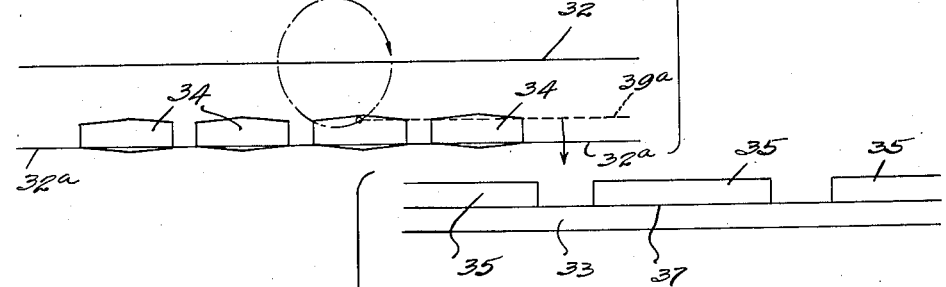
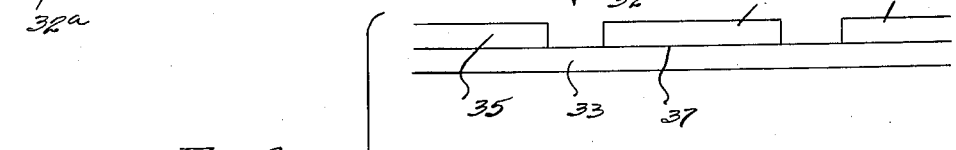
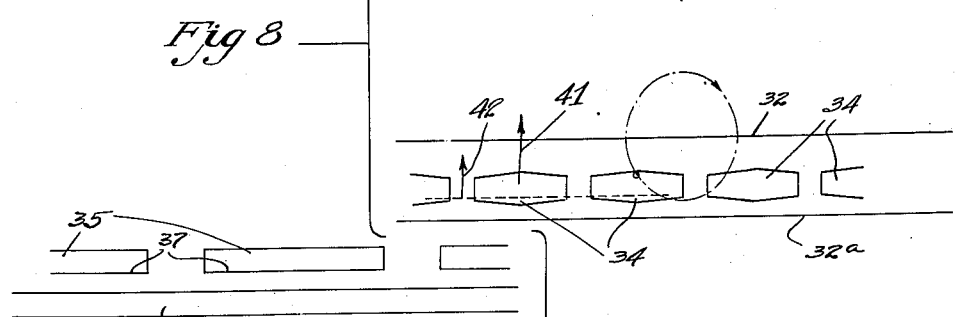
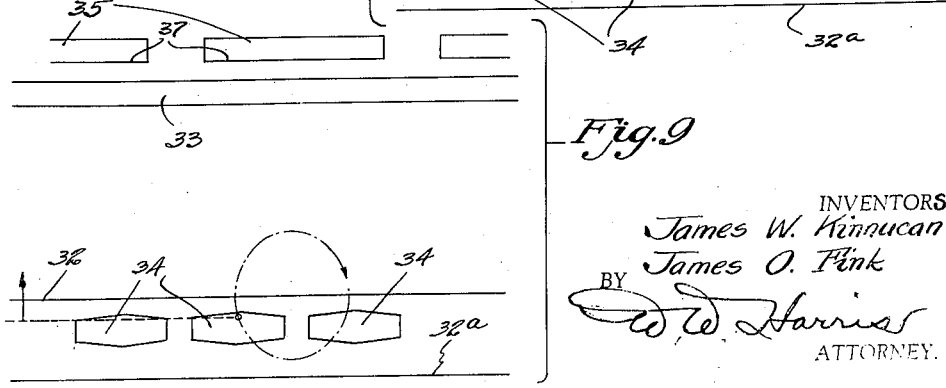

Patented Feb. 11, 1936

2,030,213

UNITED STATES PATENT OFFICE 2,030,213

ENGINE

James W. Kinnucan and James O. Fink, Detroit, Mich., assignors to Continental Motors Corporation, Detroit, Mich., a corporation of Virginia Application October 30, 1931; Serial No. 571,976

10 Claims. (Cl. 123—81)

Our invention relates to engines and more particularly to means for controlling the engine intake and exhaust. Our invention is more particularly related to engines of the sleeve valve type and especially adapted for use with compression ignition engines though obviously the principles of our invention may be incorporated in engines other than the sleeve valve type and in engines other than the compression ignition type.

The two cycle principle is well adapted for use with compression ignition engines of the sleeve valve type and in view of the fact that the development work of assignee company is directed particularly in this type of engine, we have chosen for purposes of illustration to show a sleeve valve engine of the two cycle compression ignition type having the principles of our invention incorporated therein.

An object of our invention is to provide an efficient compression ignition engine by constructing same and incorporating therein a principle of operation wherein means are provided which cooperate with the sleeve valve means for controlling the engine air intake.

A further object of our invention is to construct an improved engine of the aforesaid type by providing novel means so arranged as to provide efficient porting in order that an adequate supply of air may be supplied to the engine and the products of combustion quickly exhausted with a minimum of time.

For a more detailed understanding of our invention reference may be had to the accompanying drawings illustrating preferred embodiments of our invention and in which:

Fig. 1 is a vertical transverse sectional view through an engine cylinder illustrating our invention incorporated therewith.

Fig. 2 is a horizontal sectional view taken substantially on the line 2—2 of Fig. 1, Fig. 3 is a horizontal sectional view taken substantially on the line 3—3 of Fig. 1, Fig. 4 is a detail sectional view taken transversely through the intake zone of a single cylinder engine, Fig. 5 is a transverse sectional view taken through the exhaust zone of a single cylinder engine, Fig. 6 is a diagrammatic illustration of the engine porting showing the exhaust ports about to open, Fig. 7 is a diagrammatic illustration of the engine porting showing the intake ports about to open, Fig. 8 is a diagrammatic illustration of the engine porting showing the exhaust ports just closing, and Fig. 9 is a diagrammatic illustration of the engine porting showing the intake ports about to close.

In Fig. 1 a conventional engine structure of the sleeve valve type is illustrated and comprises a crankcase 10 constructed in a manner which provides a cylinder 11 to which a cylinder head 12 may be secured in the usual manner by bolts or other fastening devices 13. The cylinder head 12 is provided with a re-entrant portion 14 depending within the cylinder and spaced from the walls thereof to provide a sleeve pocket 15 for accommodating the upper portion of the sleeve valve means 16. The cylinder head is provided with a combustion chamber 17 and preferably carries a fuel atomizing device 18 of the usual construction constructed and arranged to supply fuel to the combustion chamber at the proper time, said fuel being conveyed to said atomizing device through a conduit 19 from any suitable source of fuel supply (not shown). A piston 20 operates within the sleeve valve means 16 and is preferably connected with the crank 21 of the crankshaft 22 by means of a connecting rod 23. The sleeve valve means 16 as shown in the illustrated embodiment of our invention preferably consists of a single sleeve of the Burt-McCollum type which is actuated with a combined reciprocating and oscillating movement with respect to the cylinder and sleeve axes whereby any point on the sleeve traverses a closed path. Any suitable means may be provided for imparting the desired movement to the sleeve 16 and in the drawings we have illustrated a wobble crank 24 having crank portions 25 to which may be secured the arms 26, said arms being thereby actuated and connected with the sleeve by a suitable ball and socket connection 27.

The illustrated embodiment of our invention shows an engine of the two cycle type and consequently the sleeve is actuated at the same speed as the crankshaft and movement is imparted to the sleeve actuating means or wobble crank by suitable transmitting devices such as gears 28 which are so constructed as to rotate the wobble shaft at the same speed as the crankshaft.

The engine as illustrated in Figs. 1 to 3 inclusive is provided with an intake chamber 30 and an exhaust chamber 31 these chambers extending preferably longitudinally of the engine and in planes transverse of the cylinder axes which are spaced axially of the cylinders. The intake chamber 30 communicates with each of the cylinders 11 through a slot 32 that preferably extends substantially the entire circumference of the cylinders and thus the cylinder communicates with the chamber in such a way as to provide a maximum of port area. The exhaust chamber 31 communicates with the cylinder through a slot or port 33 which also extends substantially around the entire circumference of the cylinders. The sleeve 16 is provided with a plurality of intake and exhaust ports 34 and 35 respectively and as shown in the accompanying drawings we preferably provide a plurality of such intake and exhaust ports which are arranged to lie in planes spaced axially of the cylinder.

In the operation of the engine the sleeve ports cooperate with the cylinder ports in a manner as diagrammatically illustrated in Figures 6 to 9 inclusive. Means are provided which cooperate with the sleeve valve means in such a manner as to control the engine intake, this means in the illustrated embodiment of our invention preferably comprising the piston 20 which is so constructed and arranged for cooperative operation with the sleeve valve means as to mask the sleeve intake ports during a portion of the cyclical events of the engine, said piston uncovering the sleeve intake ports at predetermined times for controlling the beginning and end of the engine intake preferably during that time in which the sleeve has a maximum oscillating motion. In Fig. 6 the exhaust ports 35 carried by the sleeve 16 are moved downwardly in the direction as indicated by the arrow 36 and the opening edge 37 of said ports just coincides with the upper edge of the cylinder port or slot 33. The sleeve intake ports 34 are moved downwardly as indicated by the arrow 38 and are in registration with the cylinder intake port or slot 32, but communication between the intake chamber 30 and the interior of the engine cylinder is blocked by the piston 20. As shown in Fig. 6 the top of the piston is located at a point indicated by the dotted line 39. At this point of the operation the piston is moving downwardly as indicated by the arrow 40 and the engine is so constructed as to move the piston downwardly more rapidly than the sleeve valve 16. Further movement of the engine crank and sleeve actuating means moves the piston and sleeve respectively and the next position is illustrated in Fig. 7 and it will be noted that the piston 20 is so moved as to begin to uncover the sleeve intake ports 34, the dotted line 39a illustrating the position of the top face of the piston at this moment. A further operation of the engine causes the piston to move downwardly a further distance until the top face of the piston reaches a point substantially at the level of the lower edge 32a of the cylinder intake port 32, and thus the intake port is fully open. Further operation of the engine causes the sleeve to move upwardly and as shown in Fig. 8 the sleeve and piston are both moving upwardly in the direction as indicated by the arrows 41 and 42 respectively but the piston is moving faster than the sleeve and is overtaking the same and will entirely overlie the sleeve intake ports before said sleeve intake ports leave the cylinder intake ports. In Figure 8 the sleeve exhaust ports 35 are being moved upwardly out of registration with the cylinder exhaust ports and in the position shown the engine exhaust is just closing. In Fig. 9 the engine intake is just closing.

In the two stroke cycle engine herein illustrated the engine is exhausted immediately subsequent to the explosion and before the exhaust port closes the intake opens, the air rushes in and scavenges the cylinder. On closing the engine intake the air supplied to the cylinder is compressed by the piston and the fuel is injected into the combustion chamber 17 at the proper time and ignited by the compressed air in the usual manner.

It will be noted that the piston cooperates with the sleeve valve means in such a manner as to control the beginning of the engine intake as well as the end of the engine intake, this being made possible by employing a cylinder intake port 32 of sufficient height as to allow for relative movement of the sleeve intake ports with respect to the cylinder intake port so that the piston may uncover the sleeve intake port and then overtake the same and close the port before the sleeve intake port passes out of registration with the cylinder intake port.

It may be further noted that the engine air intake is effected during that time of sleeve movement when the sleeve has attained its maximum oscillating sleeve motion and when the relative reciprocating motion of the sleeve valve means is at its minimum. The piston effects a closing of the engine intake prior to the time the reciprocating sleeve motion attains the maximum (see Fig. 9).

The engine as herein illustrated is provided with a jacket 50 arranged to provide maximum cooling for the exhaust chamber 31, said jacket portion being constructed in a manner as generally illustrated in Fig. 1 which provides a jacket portion above and below the chamber as well as adjacent the outside wall thereof. Preferably this jacket does not extend below the intake chamber since it is not so essential to cool the intake passage as the exhaust passage of the engine.

From the above description it may be noted that we have provided a sleeve valve compression ignition engine adapted for operation on the two stroke cycle which may be efficiently operated for a maximum power output and which may be economically manufactured with a minimum of time and labor. Furthermore, an engine of this type, operating on the two stroke cycle may be operated with maximum fuel economy and will provide a maximum of engine performance. The novel arrangement and construction for supplying an adequate supply of air to the engine cylinder provides for more efficient engine operation and the means whereby the engine air intake is controlled provides a maximum of port area for supplying the required amount of air necessary for scavenging the cylinder and for combustible purposes.

It will be apparent to those skilled in the art to which my invention pertains that various modifications and changes may be made therein without departing from the spirit of my invention or from the scope of the appended claims.

What we claim as our invention is:

1. In an engine of the sleeve valve type having a cylinder ported for intake and exhaust, sleeve valve means controlling said ports and having a combined reciprocating and oscillating motion, and means cooperating with said sleeve valve means for ending the engine intake period prior to the closing of the cylinder intake port and prior to the time said sleeve valve means attains its maximum reciprocating motion.

2. In an engine of the sleeve valve type having a cylinder ported for intake and exhaust, sleeve valve means controlling said ports and having a combined reciprocating and oscillating motion, and means cooperating with said sleeve valve means for controlling the beginning and ending of the engine intake period, said engine intake period being open during the time said sleeve valve means attains its maximum oscillating motion.

3. In an engine of the sleeve valve type having a cylinder ported for intake and exhaust, sleeve valve means controlling said ports and having a combined reciprocating and oscillating motion, and means cooperating with said sleeve valve means for controlling the ending of the engine intake period subsequent to the maximum oscillating motion and prior to the maximum reciprocating motion of said sleeve valve means.

4. In an engine of the sleeve valve type having a cylinder ported for intake and exhaust, said cylinder intake and exhaust ports respectively spaced axially of the cylinder, ported sleeve valve means for controlling said ports and having a combined reciprocating and oscillating motion, and a piston cooperating with said sleeve valve means and adapted for masking the sleeve intake port during the time said sleeve valve means attains maximum reciprocating motion whereby to control engine intake period.

5. In an engine of the sleeve valve type having a cylinder ported for intake and exhaust, said cylinder intake and exhaust ports respectively spaced axially of the cylinder, ported sleeve valve means for controlling said ports and having a combined reciprocating and oscillating motion, and a piston cooperating with said sleeve valve means for controlling the ending of the intake period prior to the time said sleeve valve means attains its maximum reciprocating motion.

6. In an engine of the sleeve valve type having a cylinder ported for intake and exhaust, said cylinder intake and exhaust ports respectively spaced axially of the cylinder, ported sleeve valve means for controlling said ports and having a combined reciprocating and oscillating motion, and a piston cooperating with said sleeve valve means for masking said sleeve intake port prior to closing of said cylinder intake port, whereby to control the engine intake period, said engine intake period being open during the time said sleeve valve means attains its maximum oscillating motion but ending prior to the time it attains its maximum reciprocating motion.

7. In a two-cycle engine of the sleeve valve compression ignition type having a cylinder ported for air intake and exhaust of the products of combustion, sleeve valve means controlling said ports and having a combined reciprocating and oscillating motion, and means cooperating with said sleeve valve means for controlling the intake of air into the engine cylinder, said means effecting air intake during the time said sleeve valve means attains its maximum oscillating motion.

8. In a two-cycle engine of the sleeve valve compression ignition type having a cylinder ported for air intake and exhaust of the products of the combustion, sleeve valve means controlling said ports and having a combined reciprocating and oscillating motion, and a piston cooperating with said sleeve valve means for controlling the beginning and ending of the engine intake period, said engine air intake period being open during the time said sleeve valve means attains its maximum oscillating motion but ending prior to the time it attains its maximum reciprocating motion.

9. In a two-cycle engine of the sleeve valve compression ignition type having a cylinder ported for air intake and exhaust of the products of combustion, said intake and exhaust ports spaced axially of the cylinder, sleeve valve means controlling said ports and having a combined reciprocating and oscillating motion, and means cooperating with said sleeve valve means for controlling the intake of air into the engine cylinder during the time said sleeve valve means attains its maximum oscillating motion.

10. In a two-cycle engine of the sleeve valve compression ignition type having a cylinder ported for air intake and exhaust of the products of combustion, said intake and exhaust ports spaced axially of the cylinder, sleeve valve means controlling said ports and having a combined reciprocating and oscillating motion, and a piston cooperating with said sleeve valve means for masking said sleeve intake port according to a prearranged plan, whereby to control the beginning and ending of the engine air intake period, said beginning and ending of engine air intake period respectively effected just prior to and subsequent to the time said sleeve valve means attains its maximum oscillating motion.

JAMES W. KINNUCAN.
JAMES O. FINK.